United States Patent [19]
Pavelka et al.

[11] Patent Number: 6,050,027
[45] Date of Patent: Apr. 18, 2000

[54] CONTAINER FOR SHIPPING YOUNG PLANTS OR SEEDLINGS

[75] Inventors: Steven W. Pavelka, Akron; David Bokmiller, Hudson, both of Ohio

[73] Assignee: Landmark Plastic Corporation, Akron, Ohio

[21] Appl. No.: 09/225,784

[22] Filed: Jan. 5, 1999

[51] Int. Cl.[7] .............................. A01G 9/02; B65D 85/50
[52] U.S. Cl. ................................ 47/84; 47/66.4; 47/66.5; 47/85; 206/423
[58] Field of Search ...................... 47/66.1, 66.2, 47/66.3, 66.4, 77, 84, 85, 86, 87, 28.1, 66.6, 69; 206/423

[56] References Cited

U.S. PATENT DOCUMENTS

| | | | |
|---|---|---|---|
| 2,455,295 | 11/1948 | Cox | 206/521.15 |
| 3,009,291 | 11/1961 | Blackmore | 47/87 |
| 4,000,580 | 1/1977 | Biehl | 47/14 |
| 4,330,059 | 5/1982 | Freeman | 206/423 |
| 5,592,775 | 1/1997 | Dew | 47/61 |
| 5,613,605 | 3/1997 | Angeles et al. | 206/423 |

*Primary Examiner*—Michael J. Carone
*Assistant Examiner*—Son T. Nguyen
*Attorney, Agent, or Firm*—Oldham & Oldham Co., LPA

[57] ABSTRACT

A container for shipping or transporting one or more young plants or seedlings, especially through the mail. The container has an open top and is made preferably of a thin, very light-weight, thermoformed plastic. The container is divided into two sections: a bottom section for receiving the plant pot and/or root ball and an upper section for receiving the stem and leaves. A cover is connected by a living hinge to the bottom section. The cover acts to hold the plant pot and/or root ball in place and to reduce evaporation of moisture from the root region of the plant. The container is provided with a wall separating the upper and bottom sections. The wall is supplied with a smoothly contoured notch that permits the plant stem to pass from the bottom section to the upper section, and the cover or lid utilizes a "V"-shaped projecting member to gently direct the plant's leaves and stem into the contoured notch. A combination of engaging recesses and projections form a closure system that holds the lid in place.

12 Claims, 5 Drawing Sheets

CONTAINER FOR SHIPPING YOUNG PLANTS OR SEEDLINGS

FIELD OF THE INVENTION

The present invention relates to a container for plants, and more specifically, to a container for shipping or transporting young plants or seedlings, especially through the mail and other similar delivery modes.

BACKGROUND OF THE INVENTION

Shipping of vegetable and ornamental plants generally, and more particularly, smaller, fragile plants and seedlings that have yet to reach maturity, has always posed certain challenges for growers, distributors and retailers. Sustaining the plants in a viable condition and protecting them from handling damage very often have been primary concerns. Over time, methods of buying, selling and delivering plants have undergone significant change. Early on, plants were made available and purchased on a carry-out basis at a local nursery. Later, plants became available through more indirect means such as grocery, hardware and discount stores, as well as through various other middleman outlets. More recently, purchasing via mail and telephone order from direct mail catalogs distributed by non-local vendors has become increasingly prevalent. Plants and seedlings ordered from such catalogs typically are delivered to the customer through the mail or other similar means. The advent of long distance shipping of plants through the mail and other means has resulted in the creation of a variety of containers designed to maintain and guard plants during shipment. Some examples of containers created with such purposes in mind can be found in U.S. Pat. Nos. 5,613,605; 4,471,573; 3,342,329; 3,021,046 and 2,736,138.

U.S. Pat. No. 5,613,605 discloses a plant package for use in self-service retail sales stores, as well as other sales methods such as mail order. The package is a self supporting, light transmissive polymer shell formed by two separate elements that snap together to fully enclose a single plant.

U.S. Pat. No. 4,471,573 discloses a folding package for up to three plant pots filled with soil and plants, bulbs or tubers. The package is used for the transport and display of the plant item in shops and consists of an assembly of three blocks of triangular shape that when folded together enclose the pot and stem region of the plant items contained therein. The package preferably is manufactured from a transparent plastic material.

U.S. Pat. No. 3,342,329 discloses a container for transporting up to two potted plants. The container is comprised of up to two inner boxes and an outer box. The inner and outer boxes are made of cardboard. The inner boxes are fixable to the outer box and enclose the plant pot. A rectangular opening in the inner boxes is provided for the plant stem to extend through.

U.S. Pat. No. 3,021,046 discloses a shipping container that may be formed from single piece of flat material, such as heavy paper or cardboard or flexible plastic material. The container completely encloses the plant and has a structure for supporting the pot in the container and securing the root ball of the plant.

U.S. Pat. No. 2,736,138 discloses a two-piece, collapsible carton used with a transparent, heat-sealed wrapper for shipment and handling and for display of potted or balled plants.

While the known container examples listed above provide varying degrees of plant protection and sustenance, all but one have multi-piece constructions that are more costly to produce and more time-consuming to assemble than a single-piece structure. The known single-piece container is not suitable for mail shipment of plants, however, as it provides an enclosure only for the pot, soil and plant root region. Additionally, in the case of the other constructions, a potential disadvantage associated with them arises from their forming a complete enclosure about the plant. A complete enclosure does not afford a plant with an opportunity to breathe and may also trap excess moisture which may promote mold, mildew and other undesirable conditions. On the other hand, the container of the present invention is a single-piece, easily producible, no-assembly, container that not only protects the pot, soil and root region of a plant, but also shields the stem and leaf region with a structure that allows the plant to breathe.

SUMMARY OF THE INVENTION

The present invention is a container for shipping or transporting one or more young plants or seedlings, especially through the mail and other similar delivery modes. The container has an open top and is made preferably of a thin, very light-weight, thermoformed plastic which need not be transparent. The container is divided into two sections: a bottom section for receiving the plant pot and/or root ball and an upper section for receiving the stem and leaves. A cover is connected by a living hinge to the bottom section. The cover acts not only to enclose the bottom section, but also to hold the plant pot and/or root ball in place and to reduce evaporation of moisture from the root region of the plant. The container is provided with a wall separating the upper and bottom sections. The wall is supplied with a smoothly contoured notch that permits the plant stem to pass from the bottom section to the upper section, and the cover or lid utilizes a "V"-shaped projecting member to gently direct the plant's leaves and stem into the contoured notch. A combination of engaging recesses and projections provided in the bottom section of the container form a closure system that holds the lid in place against the plant pot and/or root ball.

DETAILED DESCRIPTION OF THE PREFERRED EMBODIMENT

Figure 1A:
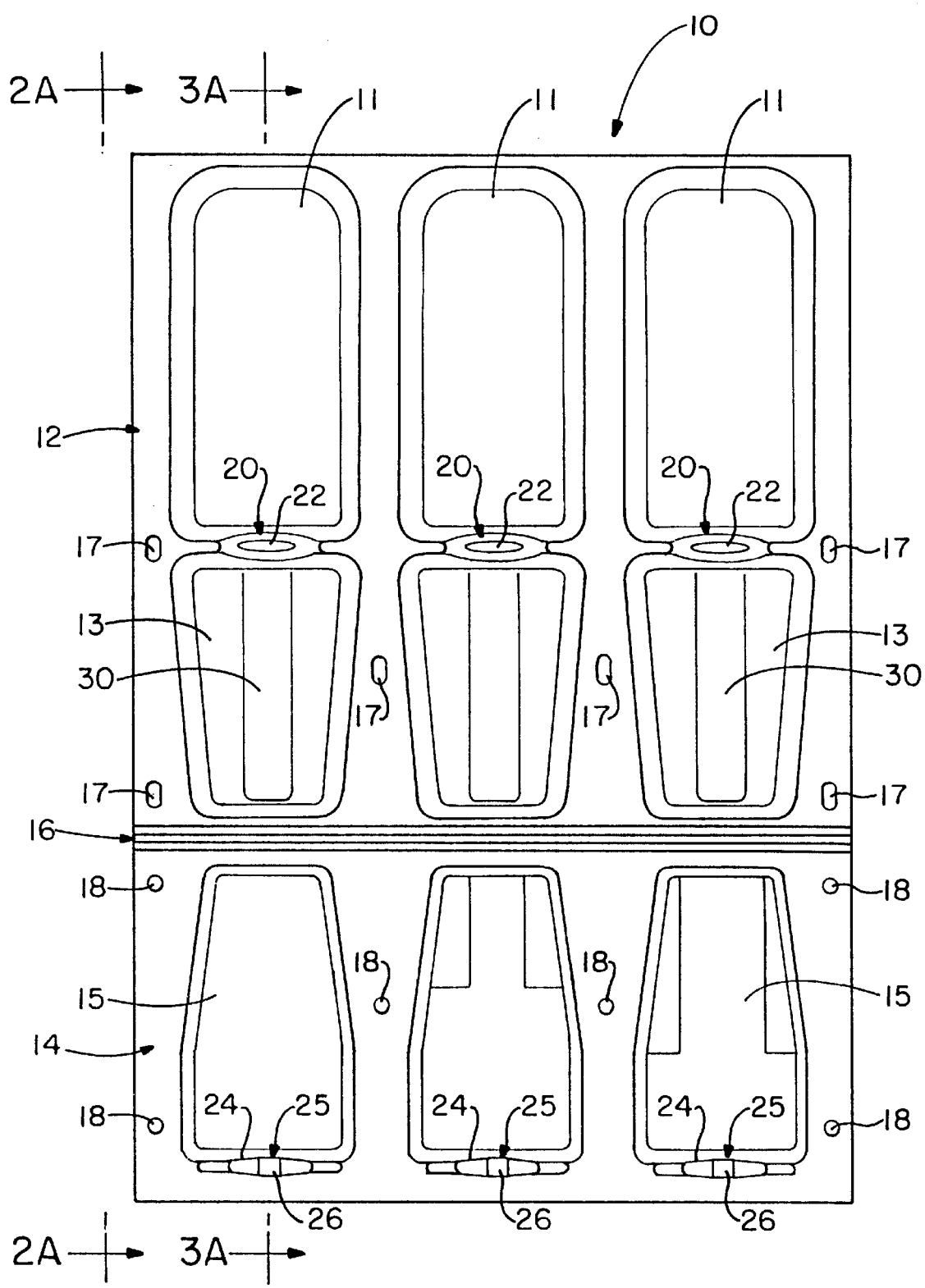
FIG. 1A is a front view of the container of the present invention, wherein the container is shown in a fully open condition.
Figure 1B:
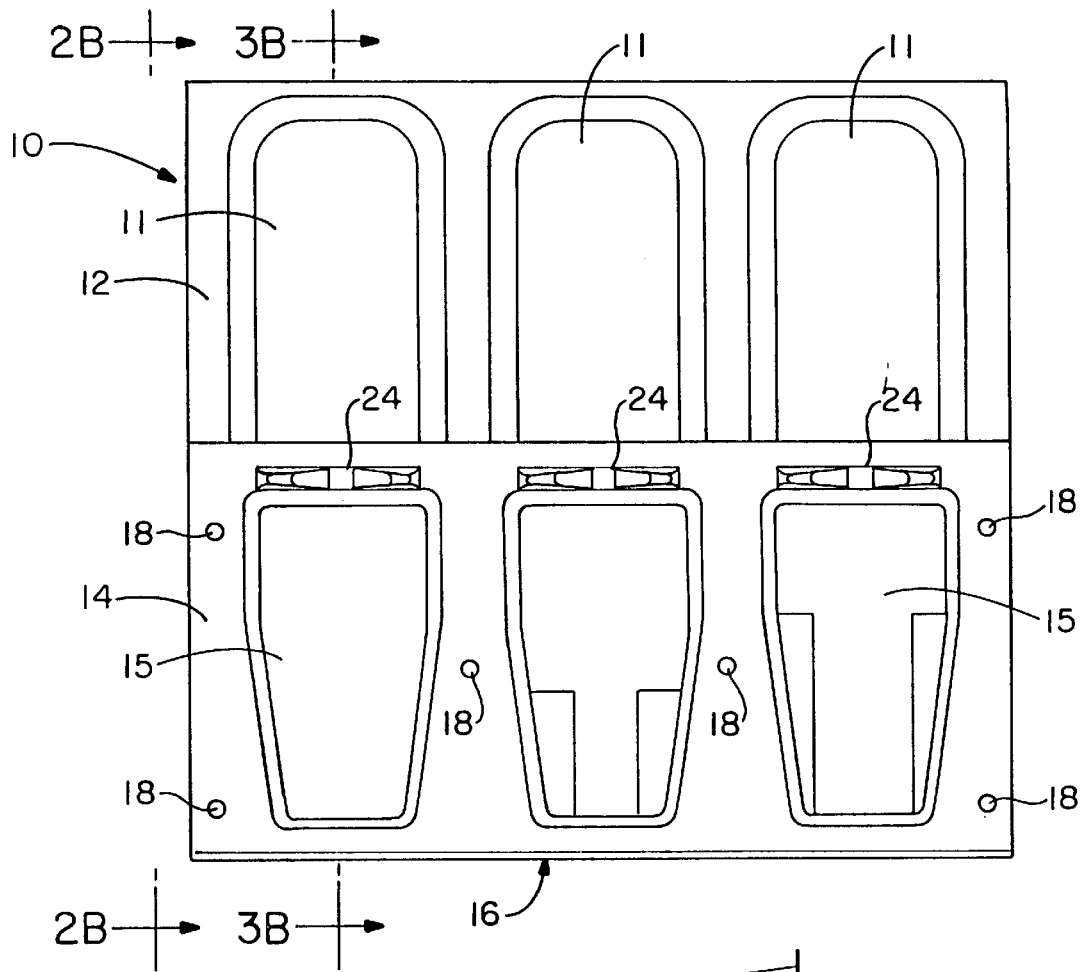
FIG. 1B is a front view of the container of the present invention, wherein the container is shown in a closed condition.

A container for shipping or transporting young plants or seedlings in accordance with a preferred embodiment of the present invention is indicated generally in FIGS. 1A and 1B by the reference numeral 10. The container 10, which is a thin-walled, single-piece receptacle molded from any of a number of known thermoformed, non-porous plastic substances, is comprised generally of a first body portion 12, a second body portion 14 and a movable hinge means 16. The first body portion 12 is provided with at least one pair of elongated, relatively deep, interconnected compartments 1I1 and 13 which together are capable of receiving a young plant or seedling. (It will be noted in the drawings that the preferred embodiment of the present invention is shown to have three pairs of compartments 1I and 13; however, any number of pairs of compartments 11 and 13, whether that number is less than or more than three should be considered to be within the scope of the present invention.) Each compartment 11 receives the stem and leaf portion of the plant, and the compartment 13 receives the root portion of the plant, either with or without a pot and growing medium. The second body portion 14 is provided with a least one elongated, relatively shallow compartment 15. (Like the pairs of the deep compartments 11 and 13, three shallow compartments 15 are shown in the drawings for the preferred embodiment, but fewer or more than three shallow compartments 15 may be provided to correspond to the number of pairs of the compartments 11 and 13.) The movable hinge means 16 is a living hinge that connects the first body portion 12 and the second body portion 14 and that, as suggested by the arrow and dashed outline provided in FIG. 2A, allows the second body portion 14 to be rotated toward and make contact with the first body portion 12 in the vicinity of the compartment 13. When the second body portion 14 is rotated in such manner, the deep compartment 13 and the shallow compartment 15 adjoin one another and thus form a semi-enclosed space for the root portion of the plant.

Figure 2B:
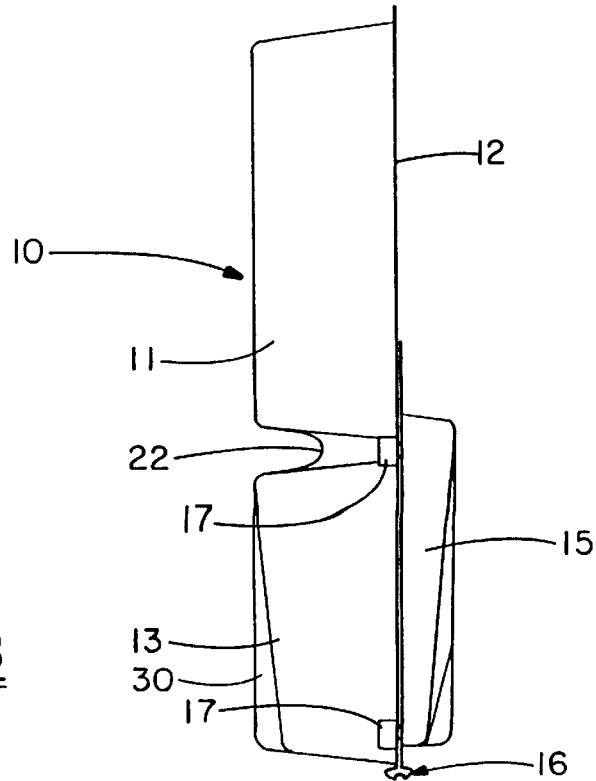
FIG. 2B is a side view of the container of the present invention, taken in the direction of line 2B—2B shown in FIG. 1B.
Figure 2A:
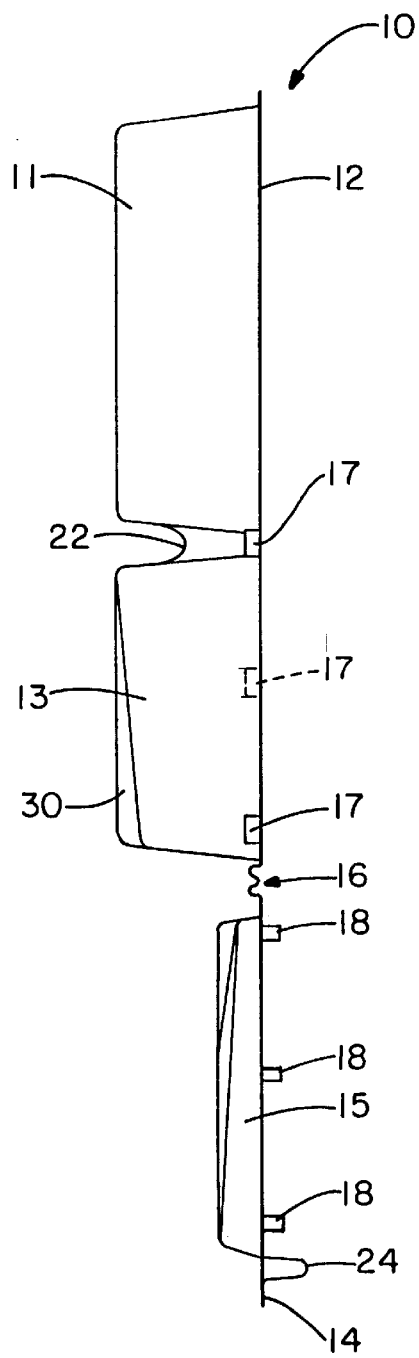
FIG. 2A is a side view of the container of the present invention, taken in the direction of line 2A—2A shown in FIG. 1A.

As may be clearly seen in FIGS. 1A and 2A, the first body portion 12 is provided with a plurality of cylindrical recesses 17 positioned to the side of and between the deep compartments 13. The second body portion 14 is provided with a plurality of hollow, pinlike projections 18. Each of the projections 18 has an outer diameter that is substantially the same of the inner diameter of each of the cylindrical recesses 17. The projections 18 are situated to the side of and between the shallow compartments 15 at locations that permit the projections to be received by the recesses 17 and to secure the second body portion 14 to the first body portion 12. (See FIG. 2B.)

Figure 3A:
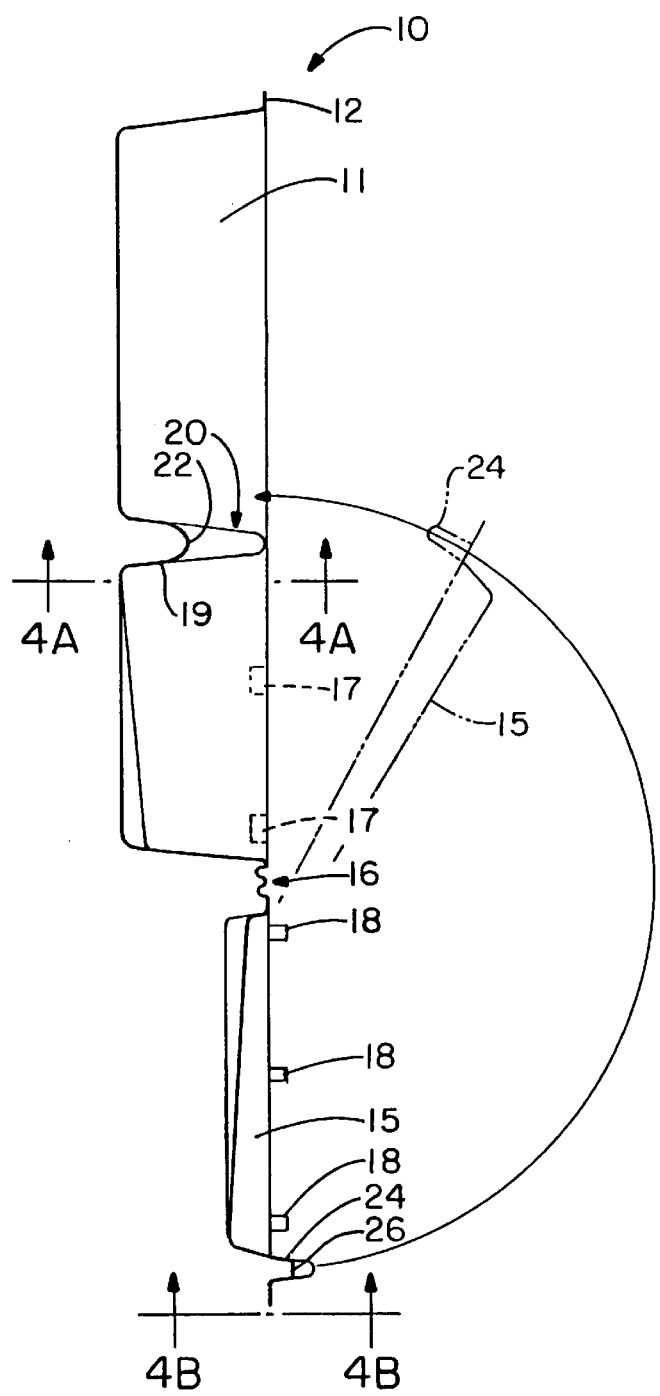
FIG. 3A is a side cross-sectional view of the container of the present invention, taken at and in the direction of line 3A—3A shown in FIG. 1A.
Figure 4B:
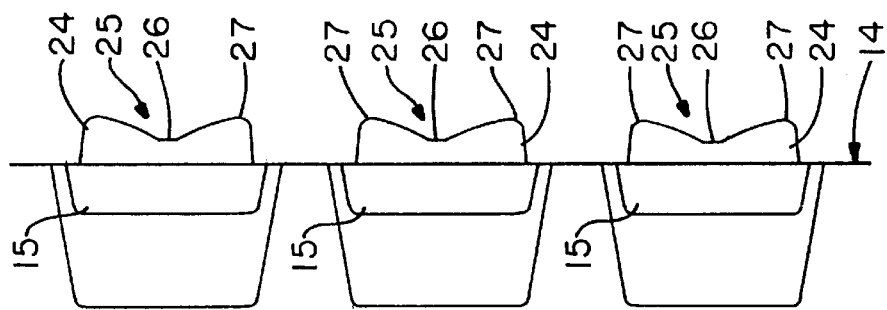
FIG. 4B is a top cross-sectional view of the container of the present invention, taken in the direction of the line 4B—4B shown in FIG. 3A.
Figure 4A:
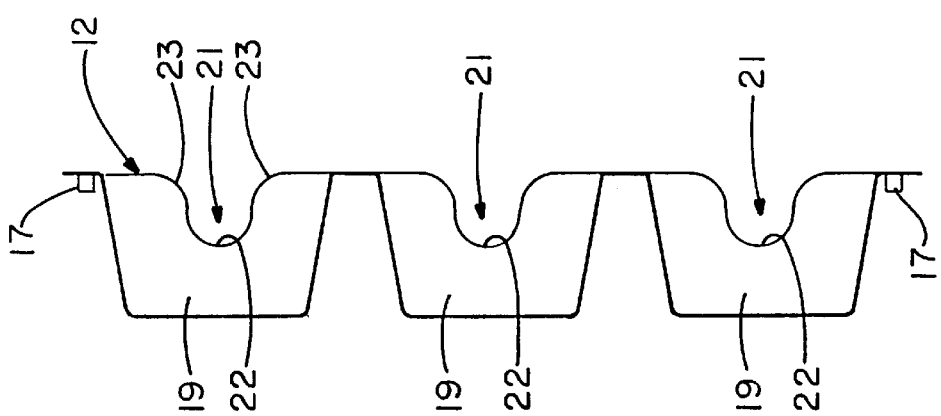
FIG. 4A is a top cross-sectional view of the container of the present invention, taken in the direction of the line 4A—4A shown in FIG. 3A.

Each pair of the compartments 11 and 13 of the first body portion 12 are partially separated by a divider 19. As shown in FIG. 3A, the divider 19 extends perpendicularly away from the back of the first body portion 12 and defines an exterior void 20 between the compartments 11 and 13. As shown in FIG. 4A, the divider 19 is shaped to define a relatively deep and narrow, U-shaped groove 21 having a smoothly contoured (rounded) edge 22 about the entire periphery thereof and a pair of gently flared corners 23 that are joined to the front of the first body portion 12.

Figure 3B:
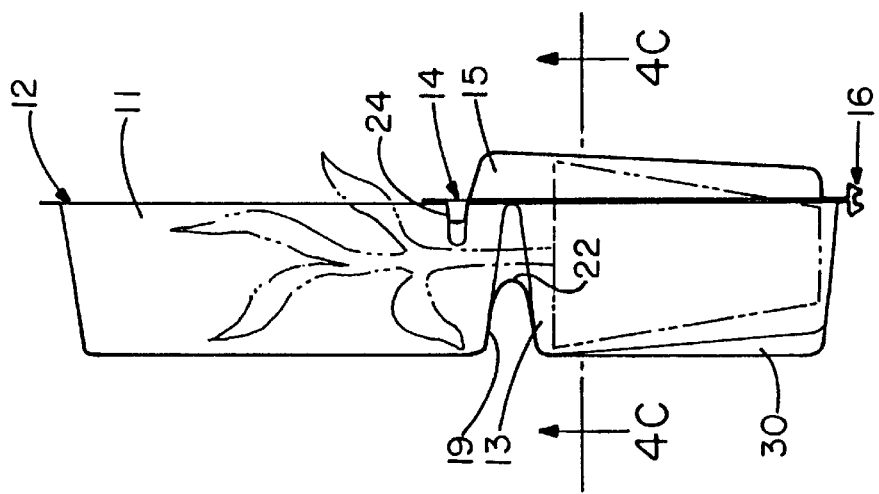
FIG. 3B is a side cross-sectional view of the container of the present invention, taken at and in the direction of line 3B—3B shown in FIG. 1B.
Figure 5:
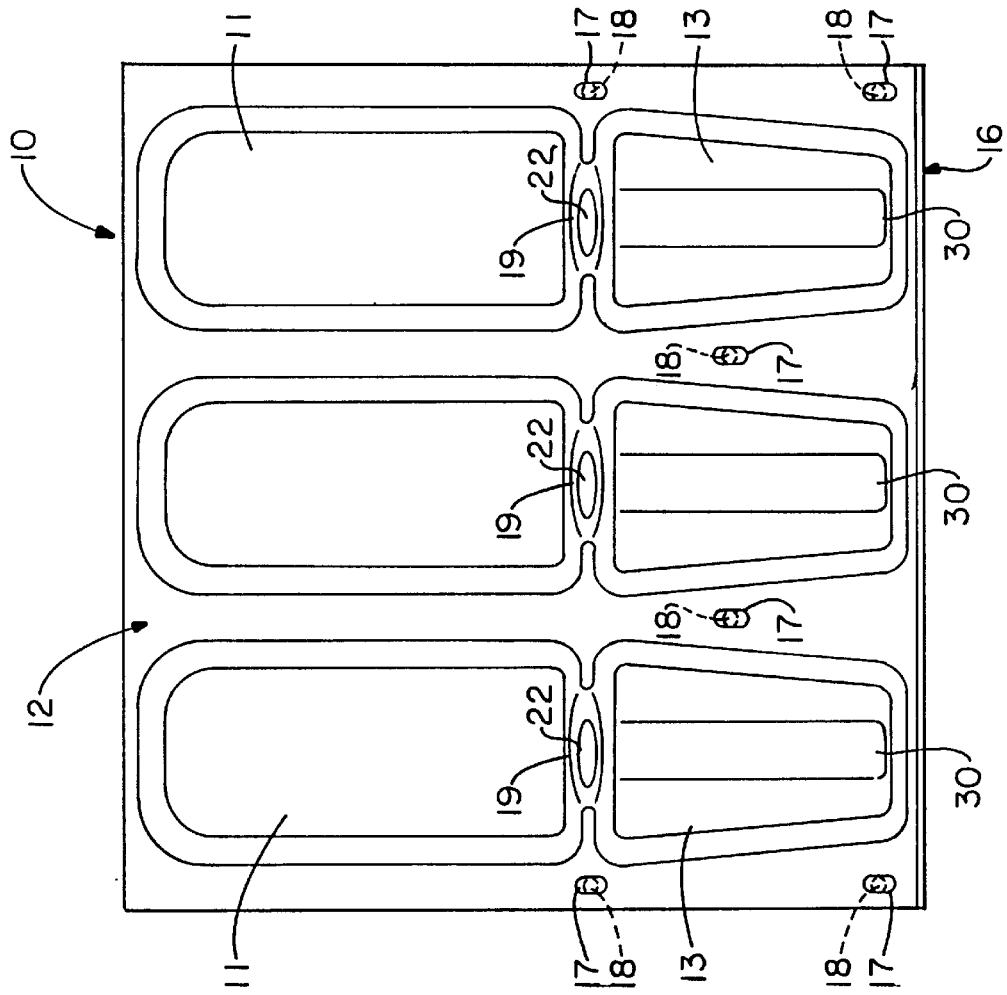
FIG. 5 is a rear view of the container of the present invention.
Figure 4C:
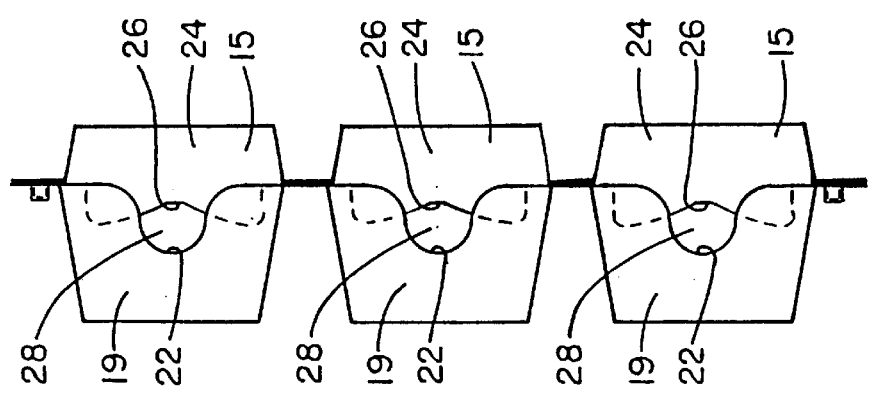
FIG. 4C is a top cross-sectional view of the container of the present invention, taken in the direction of the line 4C—4C shown in FIG. 3B.

The second body portion 14 is provided with at least one extension member 24. As shown in FIG. 2A, an extension member 24 is located near the free end of the second body portion 14 and extends perpendicularly away from the opening of each of the shallow compartments 15. As shown in FIG. 4B, the extension 24 is shaped to define a relatively shallow and wide, V-shaped notch 25 having a truncated base 26. To the left and the right of the truncated base 26, prong-like structures 27 are provided. The base 26 is flat, and the prong-like structures 27 are contoured like the U-shaped groove 21 of the divider 19. As shown in FIG. 3B and in FIG. 4C, when the second body portion 14 is secured to the first body portion 12, the extension 24 will be situated at an elevation that is slightly above the divider 19 and will overlap the flared corners 23 and a portion of the groove 21. As may be clearly seen in FIG. 4C, the overlap will define an opening 28 through which a stem of a young plant or seedling may pass and be cradled during shipment. It will also be noted that the opening 28, though large enough to accommodated the plant stem, will be small enough to minimize the loss or soil and or moisture from the compartment defined by the compartments 13 and 15 of the container 10. It further will be noted that the compartment 1I containing the leaved portion of the plant is open and thereby permits an exchange of air and release of excess moisture from the leaf region during transit.

Upon reference to FIGS. 1A, 1B, 2A, 2B, 3A, 3B and 5, it will be noted that the container 10 of the present invention may be provided with buttress-like projections 30 that extend outwardly from the deep compartments 13 and the shallow compartments 15. The buttress-like projections act to reinforce the compartments 13 and 15 and to permit stacking or side-by side standing of more than one of the containers 10 so that the upper portion of the plants held in each of the containers may be adequately separated and thus be kept from damaging one another.

While the preferred embodiment of the invention has been described above, it will be recognized and understood that various modifications may be made therein and the appended claims are intended to cover all such modifications which may fall within the spirit and scope of the invention.

What is claimed is:

1. A container for shipping by mail and other similar delivery modes a young plant having a stem and leaf portion and a root portion, the container comprised of:

a first body portion having a first body portion vertical height and a first body portion horizontal width and further having at least one pair of interconnected, elongated first body portion compartments, said at least one pair of first body portion compartments being comprised of an upper first body portion compartment for receiving said stem and leaf portion of said young plant and a lower first body portion compartment for receiving said root portion of said young plant;

a second body portion having a second body portion vertical height that is substantially less than said first body portion vertical height and a second body portion horizontal width that is substantially the same as said first body portion horizontal width and further having at least one second body portion compartment; and a movable hinge means for rotatably connecting said first body portion to said second body portion and causing said first body portion to make contact with said second body portion so that said lower first body portion compartment openly adjoins said second body portion compartment and said first body portion compartment and said second body portion cooperate to define a semi-enclosed space for said root portion of said young plant.

2. A container as claimed in claim 1, wherein said upper first body portion compartment and said lower first body portion compartment are separated by a dividing means, said dividing means extending a substantial horizontal distance away from the back and toward the front of said first body portion and having a shape that defines a U-shaped groove through which said stem and leaf portion of said young plant passes.

3. A container as claimed in claim 2, wherein said U-shaped groove has a smoothly rounded edge and a pair of gently flared corners, said pair of corners being joined to the front of said first body portion.

4. A container as claimed in claim 1, wherein said second body portion has at least one second body portion extension member, said at least one second body portion extension having a V-shaped notch and being located proximate to said at least one second body portion compartment.

5. A container as claimed in claim 1, wherein said hinge means is a flexible living hinge, said hinge being situated and running laterally between said first body portion and said second body portion and permitting said second body portion and said at least one second body portion compartment therein to be rotatably moved toward said lower first body portion compartment.

6. A container as claimed in claim 5, wherein said first body portion is provided with a plurality of recesses, said second body portion is provided with a plurality of projections, said recesses and projections being situated respectively to the sides of said lower first body portion compartment and said at least one second body portion compartment and said recesses and projections further being situated so that when said second body portion is rotatably moved toward said first body portion said projections engage said recesses and permit said second body portion and said first body portion to become securely closed.

7. A container as claimed in claim 6, wherein when said second body portion and said first body portion become securely closed, said lower first body portion compartment and said second body portion compartment are in communication with one another and said second body portion extension member overlaps said U-shaped groove and defines an opening between said upper first body portion compartment and said lower first body portion compartment.

8. A container as claimed in claim 5, wherein said first body portion, said second body portion and said flexible living hinge are fabricated from thermoformed plastic.

9. A container as claimed in claim 1, wherein said first body portion has three pairs of elongated, interconnected first body portion compartments and three second body portion compartments.

10. A container as claimed in claim 1, wherein said lower first body portion compartment and said second body portion compartment have a outwardly projecting buttress.

11. A container as claimed in claim 1, wherein said lower first body portion compartment is further included in said at least one pair of first body portion compartments for receiving a soil medium.

12. A container as claimed in claim 1, wherein said lower first body compartment is further included in said at least one pair of first body portion compartments for receiving a pot-like receptacle.

* * * * *